United States Patent [19]

Chyung et al.

[11] Patent Number: 5,605,868
[45] Date of Patent: *Feb. 25, 1997

[54] OXIDATIVE STABLE CERAMIC COMPOSITES

[75] Inventors: Kenneth Chyung, Painted Post; Steven B. Dawes, Corning; David C. Larsen, Alpine; Ronald L. Stewart, Elmira, all of N.Y.

[73] Assignee: Corning Incorporated, Corning, N.Y.

[ * ] Notice: The portion of the term of this patent subsequent to Dec. 29, 2014, has been disclaimed.

[21] Appl. No.: 365,811

[22] Filed: Dec. 29, 1994

[51] Int. Cl.⁶ .............................. C03C 10/06; C03C 14/00
[52] U.S. Cl. .................................... 501/8; 501/9; 501/32; 428/367; 428/384
[58] Field of Search .................................. 501/4, 8, 9, 32, 501/95; 428/384, 367

[56] References Cited

U.S. PATENT DOCUMENTS

| | | |
|---|---|---|
| 4,324,843 | 4/1982 | Brennan et al. . |
| 4,464,475 | 8/1984 | Beall et al. . |
| 4,615,987 | 10/1986 | Chyung et al. . |
| 4,755,489 | 7/1988 | Chyung et al. . |
| 4,935,387 | 6/1990 | Beall et al. . |
| 5,132,178 | 7/1992 | Chyung et al. . |
| 5,132,253. | 7/1992 | Dawes . |
| 5,284,806 | 2/1994 | Garkaree . |
| 5,399,440 | 3/1995 | Lespade et al. ................. 501/32 X |

OTHER PUBLICATIONS

A. G. Evans, F. W. Zok, and J. Davis in "The Role of Interfaces in Fiber Reinforced Brittle Matrix Composites", *Composite Science and Technology*, 42, (1991) p. 3.

*Primary Examiner*—Karl Group
*Attorney, Agent, or Firm*—Clinton S. Janes, Jr.; Edward F. Murphy

[57] ABSTRACT

This invention is directed to the fabrication of SiC fiber reinforced, ceramic matrix composite articles exhibiting superior high temperature oxidative stability, those articles comprising:

(a) a glass-ceramic matrix wherein alkali metal and/or alkaline earth metal aluminosilicate crystals constitute the predominant crystal phase;

(b) a fiber reinforcing phase comprising SiC fibers coated with an alkali metal and/or alkaline earth metal sheet silicate entrained within said glass-ceramic matrix; and (c) a borosilicate glass phase dispersed as an intergranular glass within said glass-ceramic matrix, said borosilicate glass phase generally being present in an amount sufficient to provide an intergranular glass phase therein.

20 Claims, No Drawings

OXIDATIVE STABLE CERAMIC COMPOSITES

FIELD OF THE INVENTION

This invention is directed to the fabrication of ceramic matrix composites exhibiting high temperature oxidative stability.

BACKGROUND OF THE INVENTION

As has been explained by A. G. Evans, F. W. Zok, and J. Davis in "The Role of Interfaces in Fiber Reinforced Brittle Matrix Composites", *Composite Science and Technology*, 42, (1991) page 3, fiber reinforced glass-ceramic composites or any other ceramic matrix composite must have a weak interfacial bond between the fiber and the matrix material in order to assure the development of crack stopping, tough fracture behavior therein. Thus, in ceramic matrix composites demonstrating superior toughness, cracks which are generally initiated in the matrix are deflected along the interfacial boundary as fibers are debonded from the matrix. This necessary debonding will occur only if the debond energy is sufficiently low, when compared to the energy required to propagate a crack through the fiber, to facilitate crack deflection.

The production of SiC fiber reinforced, glass-ceramic composite articles has customarily involved three general steps:

(a) SiC fibers are coated with finely-divided particles of glass, which glass is a precursor of the desired glass-ceramic;

(b) the coated fibers are formed into tapes or woven into fabric layers which can then be stacked or otherwise fashioned into an article of a desired configuration; and thereafter (c) that article is consolidated through heat and pressure into a composite article of high density.

Consolidation temperatures ranging over the 850°–1400° C. interval can be employed, with temperatures of at least 900° C. being preferred.

Until recently, silicon carbide fiber reinforced, ceramic matrix composites that have satisfied the interfacial debonding requirement have largely had carbon- or boron nitride-dominated interfaces. Those interfaces are plagued with the problem of being easily oxidized once high temperature air reaches the interface through cracks (or porosity or other channels) from the outer surfaces of the composite. This oxidation proceeds rapidly, thereby effecting stronger fiber-matrix bonds. These stronger bonds inhibit debonding of the fibers with the result that, when stressed to develop cracks, those cracks run from the matrix through the fibers. This oxidation of the interfaces causes a precipitous loss of toughness of the composite, which phenomenon has been termed "oxidation embrittlement".

Therefore, there has been a need to develop functional debonding interfaces for SiC fiber reinforced, ceramic matrix composites which are resistant to oxidation and/or which modify the matrix material to eliminate the matrix cracking which creates pathways for the oxidation to take place over the desired range of temperatures and stress-strain behaviors. The primary objective of the present invention was to satisfy that need.

SUMMARY OF THE INVENTION

The subject invention is founded in a material and process solution to satisfy that need which involves two features. First, an oxidation resistant sheet silicate coating is applied to the SiC fibers to provide an interface where debonding of the fibers can occur. Second, a low thermal expansion, alkali metal and/or alkaline earth aluminosilicate glass-ceramic matrix is doped with a boro-silicate glass in order to increase the oxidation resistance of any in situ carbon-rich interface. The coated SiC fibers are entrained within the doped glass-ceramic matrix and the resultant composite fired to consolidation. The combination of the two processes appears to act synergistically to impart oxidation resistant toughening behavior to a SiC fiber reinforced ceramic matrix composite which is far superior to using either one of the processes alone.

GENERAL DESCRIPTION OF THE INVENTION

The present invention is applicable with a wide variety of known matrix materials, including the well known alkali metal aluminosilicate glass-ceramic matrix materials and alkaline earth metal aluminosilicate glass-ceramic matrix materials currently utilized for the fabrication of ceramic matrix composites.

Typical of the alkali metal aluminosilicate glass-ceramic matrix materials are the lithium aluminosilicate glass-ceramic matrices described in U.S. Pat. No. 4,324,843 (Brennan et al.). Potassium-stuffed, cordierite-containing glass-ceramics are also known. Because of their high strength, toughness, and refractoriness, however, alkaline earth metal aluminosilicate glass-ceramics are the generally preferred matrix materials for the present invention. Three families of such glass-ceramic materials are well recognized in the art.

The first class includes those materials wherein the predominant crystal phase is selected from the group of anorthite ($CaO \cdot Al_2O_3 \cdot 2SiO_2$) and its pseudo-binaries with mullite ($3Al_2O_3 \cdot 2iO_2$), cordierite ($2MgO \cdot 2Al_2O_3 \cdot 5SiO_2$), barium osumilite ($BaO \cdot 2MgO \cdot 3Al_2O_3 \cdot 9SiO_2$), albite solid solution ($Na_2O \cdot Al_2O_3 \cdot 6SiO_2$), and gehlenite ($2CaO \cdot Al_2O_3 \cdot SiO_2$). Those glass-ceramics are known from U.S. Pat. No. 4,615,987 (Chyung et al.) and may be produced through the crystallization of precursor glasses consisting essentially, in weight percent, of about 0–25% CaO, 0–30% SrO, 10–30% CaO+SrO, 0–15% MgO, 0–25% BaO, 0–4% $Na_2O$, 0–6%, $K_2O$, 25–38% $Al_2O_3$, 35–60% $SiO_2$, 0–12% $TiO_2$, 0–15% $ZrO_2$, 0–3% $As_2O_3$, 0–30% total of $BaO+MgO+Na_2O+K_2O+TiO_2+ZrO_2+As_23$, and 0–10% of nucleating agents selected in the indicated proportions from the group consisting of 0.1–3% $Cr_2O_3$, 0.25–3% $HfO_2$, 2–5% $MoO_3$, 0.25–3% $Nb_2O_5$, 0.25–3% $Ta_2O_5$, and 0.25–3% $WO_3$.

The second class of alkaline earth aluminosilicate glass-ceramics includes those comprising a predominant crystal phase consisting essentially of triclinic anorthite in solid solution with at least one of mullite and α-alumina. These glass-ceramics are known from U.S. Pat. No. 4,755,489 (Chyung et al.) and are produced by the thermal crystallization of precursor glasses consisting essentially, in weight percent, of 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, wherein $Al_2O_3$ is present in an amount which is at least 10 mole percent and up to 50 mole percent in excess of that present in stoichiometric triclinic anorthite.

A third class of alkaline earth aluminosilicate glass-ceramics operable in the present invention includes those wherein the principal crystal phase is selected from the group consisting of barium osumilite, cordierite, and stuffed cordierite. Some barium osumilite and barium-stuffed cordierite glass-ceramics are disclosed in U.S. Pat. No. 4,464,475 (Beall et al.). Alternative species that can replace barium in barium-stuffed cordierite include CaO, SrO, $K_2O$, and $Cs_2O$. Glass-ceramics of this type suitable for use in ceramic matrix composites in accordance with the subject invention can be produced through the thermal crystallization of precursor glasses consisting essentially, in weight percent, of about 35–60% $SiO_2$, 17–40% $Al_2O_3$, 5–5% MgO, 1–18% total of at least one member selected in the indicated proportion from the group consisting of 0–18% BaO, 0–18% CaO, 0–18% SrO, 0–18% $K_2O$, and 0–18% $Cs_2O$, 0–5% $Nb_2O_5$, 0–10% $Ta_2O_5$, 0–6% $ZrO_2$, 0–1% Si, 0–3% $As_2O_3$, and 0–10% ZnO.

Barium-stuffed cordierite glass-ceramics are especially suited for use in accordance with the present invention because they exhibit relatively low coefficients of thermal expansion and high elastic moduli. Inasmuch as those glass-ceramics constitute the most preferred embodiments of the subject invention, the following description will focus primarily upon those materials.

U.S. Pat. No. 4,935,387 (Beall et al.) and U.S. Pat. No. 5,132,253 (Dawes) disclose the synthesis of sheet silicate ceramic materials via sol-gel processing of metal alkoxide precursors, and the use of those sheet silicate materials to coat ceramic fibers for fiber reinforced composite applications. Those patents are expressly incorporated herein in their entirety. In general terms, the oxidatively stable sheet silicate is utilized as an interfacial phase in the composite to mediate the necessary weak bonding. Sheet silicates possess a weakly bonded, layered structure similar to both boron nitride and carbon which allows cracks to propagate via cleavage through the sheets. Several sheet silicate compositions have been employed as coatings for SiC fibers in ceramic composites with potassium fluorophlogopite $[KMg_3(AlSi_3O_{10})F_2]$ and barium disilicic mica $[BaMg_3(Al_2Si_2O_{10})F_2]$ being used most extensively, due to their refractoriness relative to other micas.

Barium disilicic mica-coated, SiC fiber reinforced, barium-stuffed cordierite-containing glass-ceramic composites have been observed to become stronger and tougher upon exposure to higher temperatures. As discussed herein, a barium-stuffed cordierite-containing glass-ceramic means a glass-ceramic wherein barium-stuffed cordierite crystals constitute the predominant crystal phase, but wherein minor amounts of such secondary crystal phases as forsterite, spinel, and/or celsian may also be present. Thus, average flexural strengths of 26,000 psi (~179.4 MPa) have been recorded at 25° C., 35,000 psi (~241.5 MPa) at 1000° C., and 74,000 psi (~510.6 MPa) at 1200° C. The following conclusions were drawn from those measurements:

(1) the mica interface can be formed without coincident formation of a functional carbon layer, as is evidenced by the low strength at 25° C.; and (2) the functionality of the mica layer increases with increasing temperatures, as is indicated by the elevated strength at 1000° C. and the much enhanced strength at 1200° C.

Based upon those conclusions, it was conjectured that, to develop fully toughened composite behavior over the entire temperature interval of 25°–1200° C., the mica layer must either be more fully crystalline to facilitate crack deflection at lower temperatures, or must be rendered more functional through the inclusion of other synergistic toughening mechanisms.

U.S. Pat. No. 5,284,806 (Gadkaree) discloses fiber reinforced glass-ceramic matrices containing a borosilicate glass phase dispersed as an intergranular glass within the glass-ceramic matrix. The text of that patent is expressly incorporated herein in its entirety. The fundamental concept underlying that disclosure resided in the addition of a small amount of a borosilicate glass phase to the crystalline glass-ceramic phase to promote viscous plasticity at elevated temperatures in the matrix, thereby forming a crack blunting phase in the matrix.

Further laboratory investigations have demonstrated that the addition of borosilicate glass also modifies the interface by incorporating boron and nitrogen into the in situ carbon layer. (The nitrogen content results from impurities in the SiC fibers.) The resulting fiber-containing composite demonstrated improved oxidation resistant behavior. The borosilicate glass contains about 1–30% $B_2O_3$ by weight; the intergranular glass phase comprises about 1–12% by weight of the total weight of the glass-ceramic matrix; and the level of $B_2O_3$ in the composite does not exceed about 2.5% by weight of the glass-ceramic matrix. The glass-ceramic matrix may contain an alkali metal aluminosilicate such as a lithium aluminosilicate as the predominant crystal phase, but, preferably, it contains a predominant crystal phase selected from the group consisting of barium osumilite, cordierite, and stuffed cordierite, and has a composition consisting essentially, expressed in terms of weight percent, of about 35–60% $SiO_2$, 17–40% $Al_2O_3$, 5–15% MgO, 1–18% total of at least one oxide of stuffing species selected from the group consisting of BaO, CaO, SrO, $K_2O$, and $Cs_2O$, 0–5% $Nb_2O_5$, 0–10% $Ta_2O_5$, 0–6% $ZrO_2$, 0–1% Si, 0–3% $As_2O_3$, and 0–10% ZnO. The most preferred matrices are prepared from barium-stuffed cordierite-containing glass-ceramics.

As explained in U.S. Pat. No. 5,284,806, supra, the operable dopant borosilicate glasses generally comprise about 1–30% by weight $B_2O_3$ and may contain other oxides such as the alkali metal and/or alkaline earth metal oxides in addition to $B_2O_3$ and $SiO_2$. An example of a commercially available borosilicate glass exhibiting properties suitable for use as a dopant is marketed by Corning Incorporated, Corning, New York as Code 7761. That glass, consisting essentially, in weight percent, of about 2.8% KO, 18.4% $B_2O_3$, and 78.8% $SiO_2$, exhibits a strain point of about 458° C., an annealing point of about 510° C., and a softening point of about 820° C. It also demonstrates a very high working point of about 1300° C., thereby indicating a relatively flat viscosity-temperature curve. That combination of properties permits the glass to provide good oxidation protection in a fiber reinforced ceramic composite over a broad range of temperatures without undesirably reducing the creep resistance of the composite product.

As further explained in U.S. Pat. No. 5,284,806, both the properties of the glass and the quantity of glass included can be varied to achieve close control over the properties of the final product. For example, the viscosity of the glass within a specific temperature range can be controlled by raising or reducing the content of alkali metal oxides, such as $K_2O$, in the glass. Thus, reducing the concentration of alkali metal oxide typically produces a "harder" glass, i.e., a glass exhibiting a higher viscosity at a given temperature, and a similar result can be achieved by reducing the ratio of $B_2O_3:SiO_2$ in the glass.

When the borosilicate glass-doped, SiC fiber reinforced, glass-ceramic composites are consolidated in a nitrogen atmosphere at temperatures in the vicinity of 1250° C., an in situ interface of modified carbon forms between the fibers and the matrix. The interfaces in the glass-doped, barium-stuffed cordierite-containing matrix composites are thinner and less ccompositionally homogeneous than that of glass-free matrix composites; i.e., the latter composites exhibit a thicker, relatively pure carbon layer. These thinner interfaces in the glass-doped composites contain boron nitride and $B_2O_3$ in the layer with carbon. This modified carbon interface appears to provide more oxidation resistance than a pure carbon layer, which feature, in turn, imparts improvement in thermal durability without losing the functionality of the carbon-rich interface.

Further laboratory investigations of the glass-doped, SiC fiber reinforced, barium-stuffed cordierite-containing glass-ceramic matrix composites, however, observed a minimum value in the flexural stress-strain behavior versus temperature at about 800° C. and also observed increased flexural creep deformation with higher glass content at 1100° C. Based upon those two observations, it was deemed likely that plastic deformation of the borosilicate glass in the matrix at temperatures greater than 800° C. serves to further improve the thermal durability of the composite by blunting cracks that propagate to the interfaces. Whereas transmission electron micrograph analyses of the microstructures of these glass-doped, barium-stuffed cordierite-containing matrix composites have indicated that most of the borosilicate glass is located in pockets at three grain junctions of the matrix, some has also been seen in interface regions. It is believed that this glass in the matrix and at the interface is probably responsible for the enhanced plasticity with increasing glass content.

As has been explained above, the present invention comprehends four fundamental steps in order to fabricate SiC fiber reinforced, ceramic matrix composites demonstrating resistance to oxidation at high temperatures. First, an alkali metal and/or alkaline earth metal-containing sheet silicate coating exhibiting oxidation resistance is applied to SiC fibers to form an interface between the fibers and the ceramic matrix where debonding of the fibers from the matrix can occur. Second, a precursor glass having a composition comprising a composite of an alkali metal aluminosilicate glass-ceramic and/or an alkaline earth metal aluminosilicate glass-ceramic matrix composition and a borosilicate glass dopant composition is prepared and comminuted to a fine powder. Third, the coated SiC fibers are entrained in the powdered glass to form a composite body. Fourth, the composite body is consolidated through heat treatment, customarily under pressure, with the concurrent conversion of the precursor glass matrix to a glass-ceramic matrix. The preferred composite materials constituting the subject of the present invention comprise barium disilicic mica-coated SiC fibers entrained within a borosilicate glass-doped, barium-stuffed, cordierite-containing matrix.

Preparation of the sheet silicate coating can be carried out utilizing either a sol-gel derived precursor sol or from a similar sol augmented with fine-grained crystalline mica particles. Mica-containing compositions prepared via sol-gel methods are disclosed in U.S. Pat. No. 4,935,387 and U.S. Pat. No. 5,132,253, both patents being discussed above and their disclosures explicitly incorporated herein by reference.

Generally, the method involves metal alkoxide precursors as starting materials which are introduced into an acidic alcohol reaction medium under a nitrogen atmosphere. Dissolution of the appropriate metal alkoxides provides a clear non-viscous sol. With certain compositions, notably barium-containing sols, it is necessary to stabilize the sol against precipitation of a component such as $BaF_2$. Complexing agents, such as crown ethers, have been employed to achieve stabilization of the sol against precipitation. A methanolic solution of ammonium fluoride is added to the metal alkoxide sol to complete the addition of the reagents. The sol remains clear and stable. The sol may be gelled via reaction with water and the solvent removed through evaporation. The gel can be converted to mica crystals by heat treatment to temperatures in excess of 800° C.

In one general method for coating the SiC fibers, the sol as prepared above is used as the coating medium prior to the addition of any water or the evaporation of any solvent. Typically, sol concentrations of precursors sufficient to yield 0.5–4 grams of mica precursor per 100 ml of sol are utilized. The fibers are dipped continuously into the sol and thereafter are thermally treated to gel and calcine the coating. The process customarily contemplates the following four steps:

(1) the fiber is pulled off a spool and run through a furnace operating at about 800° C. to remove the sizing from the fiber tow;

(2) the desized fiber is immersed into the sol to wet the tow completely;

(3) the wetted fiber absorbs water from the atmosphere to gel the coating and is dried and simultaneously agitated to prevent formation of fiber-to-fiber bonds with the gelled sol; and (4) the dried tow is exposed to temperatures of about 300° C. to calcine the gel.

Where desired, a second coating of gel can be applied by repeating the immersing, drying, and calcining steps. Thereafter, the fiber having the calcined coating is conveniently packaged onto a spool. The fiber having the calcined coating generally increases in mass by about 3–14% due to the coating.

Because in some composite applications thicker coatings may be desired and coatings with a significant fraction of the sol coating in a crystalline state may be desired, an alternate method of fiber coating to provide thicker coatings containing crystallized mica particles has been developed, this method differing from the above-described method only in the addition of solid particles of crystalline mica to the mica precursor sol. The process is described in general terms below.

To effectively act as a fiber coating, the crystalline particles must be much smaller than the diameter of the fiber. Inasmuch as the SiC fibers have a diameter of about 10–15 μm, mica particles having diameters less than about 5 μm are preferred, and most preferably will be no greater than about 1 μm.

In a typical example, 23.5 grams of a crystallized barium disilicic mica glass-ceramic powder (average particle size of 10 μm or greater) will be added to 58 ml of 2-methoxyethanol, 17 ml of methanol, 4 ml of HCl, and 0.7 ml Dow-Corning 193 dispersant. The mixture can be introduced into a Nalgene® plastic container with zirconia ball grinding media, and vibramilled for at least one week. The resultant slurry contained crystalline mica particles having an average particle size of about 4 μm. Alternatively, the mixture can be placed in an attritor mill with zirconia media and subjected to a milling action for about eight hours. The resultant mica particles have an average particle size of about 1 μm. The use of an attritor mill is preferred both because of its speed in reducing the particle sizes and in yielding a smaller final particle. Each slurry has the capability of remaining stable for a number of hours without the mica particles settling out. The solvent is formulated in the same proportions as that used to prepare the sols so that the slurry can be added to a sol without destabilization of either the sol or the particulate suspension. For purposes of coating the fibers, a combined sol plus particulate mica loading of about 2.5–15 g per 100 ml is employed. This mixture can then be utilized in the coating process described above. The resultant coated fibers typically weigh about 10–50% more than the uncoated fibers, thereby representing about a two to eight fold increase in coating mass compared to the fibers coated only with sol.

The coated fiber tows can be infiltrated with the precursor glass utilizing the slurry dip process such as is described in U.S. Pat. No. 5,284,806, supra, wherein the slurry contains organic binders to adhere the glass particles in the fiber tows. The filled tow at this point has been conveniently termed prepregged yarn. This yarn can thereafter be fashioned into unidirectional tapes or woven into fabric layers which can then be stacked, prior to removing the binders, and the stack consolidated through heat and pressure into a composite demonstrating near theoretical density. During the consolidation process, the gelled coating on the individual fibers crystallizes to the barium disilicic mica, while later in the heat treatment step, the precursor matrix glass crystallizes to a glass-ceramic. Accordingly, the consolidated composite comprises a distribution of single fibers, each of which is enveloped in a coating of barium disilicic mica in a borosilicate glass-doped, barium-stuffed cordierite-containing glass-ceramic matrix.

In summary, the present invention is specifically directed to the production of a SiC fiber reinforced, ceramic matrix composite article exhibiting superior high temperature oxidative stability, the article being comprised of three basic components:

(a) a glass-ceramic matrix wherein alkali metal and/or alkaline earth metal aluminosilicate crystals constitute the predominant crystal phase;

(b) a fiber reinforcing phase comprising SiC fibers coated with an alkali metal and/or an alkaline earth metal sheet silicate entrained within said glass-ceramic matrix; and (c) a borosilicate glass phase disposed as an intergranular glass within said glass-ceramic matrix, said borosilicate glass phase being present in an amount sufficient to provide an intergranular glass phase therein. In general, this amount will comprise about 1–12% by weight of the total weight of the matrix.

To be significantly effective in reinforcing the composite article, the SiC fibers will comprise about 25–60% by volume of the composite.

The invention is also directed to a method for increasing the high temperature oxidative stability of SiC fiber reinforced ceramic matrix composite comprising a glass-ceramic matrix wherein alkali metal and/or alkaline earth metal aluminosilicate crystals constitute the predominant crystal phase, a SiC fiber reinforcing phase, and a borosilicate glass phase disposed in said glass-ceramic matrix in an amount sufficient to provide an intergranular glass phase therein, the method comprising:

(a) coating said SiC fibers with a sol containing precursors capable of being converted upon heat treatment into barium disilicic mica, said sol optionally containing finely-divided particles of the sheet silicate; and then (b) entraining said coated fibers within said glass-ceramic matrix.

The method for coating the SiC fibers via a sol-gel process comprises the following five basic steps:

(a) preparing a sol or solution comprising precursors for the alkali metal and/or alkaline earth metal sheet silicate, which precursors in the case of barium disilicic mica, comprise a barium alkoxide and a dissolved crown ether complex of barium;

(b) contacting said SiC fibers with said sol or solution to form a coating thereon;

(c) hydrolyzing said sol or solution to form a gel;

(d) drying said gel on said fibers; and thereafter (e) heat treating said gel to calcine it.

DESCRIPTION OF PREFERRED EMBODIMENTS

In accordance with the method described in U.S. Pat. No. 5,284,806, supra, SiC fiber was passed through a slurry of glass powder to form yarn which, in turn, was wound around a rotating spool to form a continuous prepreg sheet having a unidirectional fiber orientation. After drying, this sheet was cut from the spool to provide a green prepreg mat comprising unidirectional fibers coated with the glass powder.

A ceramic matrix composite was fashioned from the prepreg mat by cutting rectangular sections approximately 10 cm×10 cm in size therefrom and stacking eight such sections in uniaxial (fiber parallel) alignment to yield a multilayer preform. The organic binders, dispersants, etc. were burned out in air at a temperature of about 650° C.

The resulting preforms were consolidated to full density, with concurrent conversion of the glass matrix material to a crystalline glass-ceramic, via a combination heat treatment hot pressing process. The preforms were gradually heated under a nitrogen atmosphere to a temperature of about 1150° C. at a pressure of about 1500 psi (10.35 MPa), and were maintained at that temperature and pressure for about 10 minutes, following which the consolidated bodies were cooled slowly to room temperature.

Table I records unidirectional flexural properties demonstrated by three examples. First, SiC fibers coated with barium disilicic mica were entrained within a barium-stuffed cordierite-containing glass-ceramic. Second, uncoated SiC fibers were entrained within a borosilicate glass-doped, barium-stuffed cordierite-containing glass-ceramic. Third, SiC fibers coated with barium isilicic mica plus a particulate mica loading of 5 grams/100 ml were entrained within a borosilicate glass-doped, barium-stuffed cordierite-containing glass-ceramic. The borosilicate glass had the same composition as that described above, viz., about 2.8% $K_2O$, 18.4% $B_2O_3$, and 78.8% $SiO_2$.

The properties were determined in the four-point bending test to the point of ultimate flexural failure of the test samples. Included in the Table for each of the composites are the temperature at which the bending test was carried out, the bending stress ($\sigma$), expressed in terms of MPa, and sample ultimate failure strain $\epsilon$, expressed in terms of %. Each test was conducted in an air atmosphere.

TABLE I

| Example | 25° C. | | 1000° C. | | 1200° C. | |
| --- | --- | --- | --- | --- | --- | --- |
| | $\sigma$ | $\epsilon$ | $\sigma$ | $\epsilon$ | $\sigma$ | $\epsilon$ |
| 1 | 179.4 | 0.1 | 248.4 | 0.2 | 510.6 | 0.7 |
| 2 | 738.3 | 0.85 | 621 | 0.66 | 503.7 | 0.85 |
| 3 | 752.1 | 0.76 | 634.8 | 0.77 | 476.1 | 1.01 |

The values reported in Table I clearly evidence the benefit of adding a borosilicate glass dopant to the barium disilicic mica coated fibers entrained within a barium-stuffed, cordierite-containing glass-ceramic. That is, the undoped composite displays excellent strength at 1200° C., but poor strength at low temperature. The flexural test does not differentiate strongly between Example 2 (uncoated SiC fibers) and Example 3 (coated SiC fibers). The differentiation between these two types of composite becomes apparent in long term testing.

SiC fiber reinforced composite plates approximately 15.25×15.25 cm in size were prepared of barium disilicic mica coated SiC fibers entrained within a borosilicate glass-doped, barium-stuffed, cordierite-containing glass-ceramic matrix fabricated in 0°/90° (cross ply) laminate architecture (Example 4). In like manner to Examples 2 and 3 above, 2.5% by weight of the borosilicate glass utilized in those Examples was incorporated here. The plates were tested in tension as a function of temperature to 1200° C., and evaluated for long term durability in air for hundreds of hours at 1100° C. and 1200° C. Table II provides a comparison of property data exhibited by those plates with similar plates prepared from uncoated SiC fibers entrained within a matrix of barium-stuffed, cordierite-containing glass-ceramic (Example 5), and with similar plates prepared from uncoated SiC fibers entrained within a 2.5% by weight borosilicate glass-doped, barium-stuffed, cordierite-containing glass-ceramic (Example 6). Again, the borosilicate glass had the composition referred to above. An in situ layer of carbon on the SiC fibers provides the weak interface in Example 5. In Example 6, the in situ interface that forms is the $BN/B_2O_3$ modified carbon layer discussed above.

Table II records the ultimate bending stress (σUlt), expressed in terms of MPa, the sample elongation (Ult) at which complete flexural failure of each composite sample occurred, expressed in terms of %, the elastic modulus (Mod.) of each sample, expressed in terms of GPa, and the character of the fracture demonstrated by each sample. All values were determined at 1200° C.

TABLE II

| Example | σ Ult | ε Ult | Mod. | Fracture Character |
|---|---|---|---|---|
| 4 | 187.7 | 0.68 | 71.8 | Fibrous |
| 5 | 93.8 | 0.34 | 71.8 | Brittle |
| 6 | 145.6 | 0.65 | 58.7 | Brittle |

The long term durability of the materials was assessed employing a stepped tensile stress rupture test at 1200° C. in air. This test involved starting at a 55.2 MPa stress level and adding 13.8 MPa more after each interval of 50 hours until failure of the composite. Table III lists the final stress, expressed in terms of MPa, where the sample survived a full 50 hours, along with the total time of the test, expressed in hours, and the character of the fracture. A comparison is provided between uncoated SiC fibers entrained within a 2.5% by weight borosilicate glass-doped, barium-stuffed cordierite-containing glass-ceramic matrix fabricated in cross ply laminate configuration (Example 7) with barium disilicic mica coated SiC fibers entrained within a 2.5% by weight boro-silicate glass-doped, barium-stuffed cordierite-containing glass-ceramic matrix fabricated in cross ply laminate configuration (Example 8). Yet again, the composition of the borosilicate glass was the same as that referred to above.

TABLE III

| Example | Final Stress | Total Time | Fracture Character |
|---|---|---|---|
| 7 | 89.7 | 245 | Brittle |
| 8 | 138 | 418 | Fibrous |

Tables I, II, and III clearly illustrate the advantage of coating the SiC fiber with the barium disilicic mica and then entraining those coated fibers within a borosilicate glass-doped glass-ceramic matrix. Thus, the mechanical properties measured in both the tensile stress test and the long term durability test unequivocally demonstrate a significant improvement brought about by coating the fibers with barium disilicic mica. In fact, the ratio of the last stress for over 50 hours compared to its fracture ultimate stress at 1200° C. is 89.7 MPa/145.6 MPa=~0.62 for the uncoated fiber composite, whereas the barium disilicic mica coated fibers gave 138 MPa/187.7 MPa=~0.74, this latter value indicating a greater degree of retained strength. Moreover, the fibrous fracture character exhibited by the coated fiber composites illustrates greater toughness than in the uncoated fiber composites.

What is claimed is:

1. A SiC fiber reinforced, ceramic matrix composite article exhibiting high temperature oxidative stability comprising:

(a) a glass-ceramic matrix wherein alkali metal and/or alkaline earth metal aluminosilicate crystals constitute the predominant crystal phase;

(b) a fiber reinforcing phase comprising SiC fibers coated with an alkali metal and/or alkaline earth metal sheet silicate entrained within said glass-ceramic matrix; and (c) a borosilicate glass phase dispersed as an intergranular glass within said glass-ceramic matrix, said borosilicate glass phase being present in an amount sufficient to provide an intergranular glass phase therein.

2. A ceramic matrix composite article according to claim 1 wherein barium-stuffed, cordierite-containing crystals constitute said alkaline earth metal aluminosilicate crystals.

3. A ceramic matrix composite article according to claim 1 wherein potassium-stuffed, cordierite-containing crystals constitute said alkali metal and alkaline earth metal aluminosilicate crystals.

4. A ceramic matrix composite article according to claim 1 wherein lithium aluminosilicate crystals constitute said alkali metal aluminosilicate crystals.

5. A ceramic matrix composite article according to claim 1 wherein potassium fluorophlogopite constitutes said alkali metal sheet silicate.

6. A ceramic matrix composite article according to claim 1 wherein barium disilicic mica constitutes said alkaline earth metal sheet silicate.

7. A ceramic matrix composite article according to claim 1 wherein said borosilicate glass contains 1–30% by weight $B_2O_3$.

8. A ceramic matrix composite article according to claim 1 wherein said borosilicate glass phase comprises about 1–12% by weight of the total weight of said glass-ceramic matrix.

9. A ceramic matrix composite article according to claim 1 wherein the concentration of $B_2O_3$ in the composite does not exceed about 2.5% by weight of the total weight of said glass-ceramic matrix.

10. A ceramic matrix composite article according to claim 1 wherein said SiC fibers comprise about 25–60% by volume of said composite.

11. A method for increasing the high temperature oxidative stability of a SiC fiber reinforced ceramic matrix composite article, said composite comprising a glass-ceramic matrix wherein alkali metal and/or alkaline earth metal aluminosilicate crystals constitute the predominant crystal phase, a SiC fiber reinforcing phase entrained in said glass-ceramic matrix, and a borosilicate glass phase dispersed in said glass-ceramic matrix in an amount sufficient to provide an intergranular glass phase therein, said method comprising the steps of:

(a) coating said SiC fibers with a gel containing a precursor capable of being converted into an alkali metal and/or alkaline earth metal sheet silicate; and (b) entraining said coated SiC fibers within said glass-ceramic matrix.

12. A method in accordance with claim 11 wherein barium-stuffed, cordierite-containing crystals constitute the predominant crystal phase.

13. A method according to claim 11 wherein potassium-stuffed, cordierite-containing crystals constitute the predominant crystal phase.

14. A method according to claim 11 wherein potassium fluorophlogopite constitutes said alkali metal sheet silicate.

15. A method according to claim 11 wherein barium disilicic mica constitutes said alkaline earth metal sheet silicate.

16. A method according to claim 11 wherein said borosilicate glass phase constitutes about 1–12% by weight of the total weight of said glass-ceramic matrix and said borosilicate glass phase contains about 1–30% by weight $B_2O_3$.

17. A method according to claim 11 wherein said SiC fibers constitute about 25–60% by volume of said composite article.

18. A method according to claim 11 wherein said SiC fibers are coated by means of a sol-gel process comprising the steps of:

(A) preparing a sol or solution containing a precursor for said alkali metal and/or alkaline earth metal sheet silicate and, optionally, also containing finely-divided particles of said alkali metal and/or alkaline earth metal sheet silicate;

(B) contacting said fibers with said sol or solution to provide a coating thereon;

(C) hydrolyzing said sol or solution to form a gel on said fibers;

(D) drying said gel on said fibers, and thereafter (E) heat treating said dry gel to calcine it on said fibers.

19. A method according to claim 18 wherein said precursor comprises a dissolved metal alkoxide and a crown ether complex of an alkaline earth metal sheet silicate.

20. A method according to claim 19 wherein said alkaline earth metal sheet silicate is barium disilicic mica.

* * * * *

UNITED STATES PATENT AND TRADEMARK OFFICE
CERTIFICATE OF CORRECTION

PATENT NO. : 5,605,868
DATED : February 25, 1997
INVENTOR(S) : Kenneth Chyung; Steven B. Dawes; David C. Larsen; Ronald L. Stewart It is certified that error appears in the above-identified patent and that said Letters Patent is hereby corrected as shown below:

In Column 2, line 45, "$As_23$" should read --$As_2O_3$--.

In Column 3, line 11, "5-5% MgO" should read --5-15% MgO--.

In Column 9, line 34, "( Ult)" should read --(≮Ult)--.

Signed and Sealed this

Second Day of September, 1997

Attest:

BRUCE LEHMAN

Attesting Officer

Commissioner of Patents and Trademarks